(12) United States Patent
Guenther

(10) Patent No.: US 10,653,275 B2
(45) Date of Patent: May 19, 2020

(54) TUNA PRESS STRAINER

(71) Applicant: Michael Raymond Guenther, Honolulu, HI (US)

(72) Inventor: Michael Raymond Guenther, Honolulu, HI (US)

( * ) Notice: Subject to any disclaimer, the term of this patent is extended or adjusted under 35 U.S.C. 154(b) by 176 days.

(21) Appl. No.: 16/011,911

(22) Filed: Jun. 19, 2018

(65) Prior Publication Data

US 2019/0380542 A1     Dec. 19, 2019

(51) Int. Cl.
*A47J 43/28*     (2006.01)
*A47J 19/00*     (2006.01)

(52) U.S. Cl.
CPC ............ *A47J 43/286* (2013.01); *A47J 19/005* (2013.01)

(58) Field of Classification Search
CPC .............................. A47J 43/286; A47J 19/005
USPC ........................................................ 100/110
See application file for complete search history.

(56) References Cited

U.S. PATENT DOCUMENTS

| | | | | |
|---|---|---|---|---|
| 1,749,178 A | * | 3/1930 | Berg ...................... | A47J 43/20 425/318 |
| 3,120,678 A | * | 2/1964 | Glenny ................ | A22C 7/0076 425/318 |
| 5,902,481 A | * | 5/1999 | Schwietert ............ | A47J 43/286 100/113 |
| 6,092,460 A | * | 7/2000 | Engelhardt ........... | A47J 43/286 100/110 |
| 8,202,073 B1 | * | 6/2012 | Kovalevich .......... | A22C 7/0046 425/318 |
| 8,926,302 B1 | * | 1/2015 | Buckley .................. | A47J 43/00 425/318 |
| 2006/0042480 A1 | * | 3/2006 | Blais ..................... | A47J 43/286 100/230 |
| 2017/0015023 A1 | * | 1/2017 | McClellan, Jr. ....... | A45D 44/00 |

* cited by examiner

*Primary Examiner* — Justin M Jonaitis

(57) ABSTRACT

The present invention may be used for pressing product and draining liquid from canned food such as tuna, drain liquids from canned food such as fruit and vegetables and press out a meat patty such as hamburger and sausage. A cap may have a press attached through a center top hole to the cap. The cap may have a width and height to fit most size canned food. The cap may have a top side drain hole. The press may have a top and a bottom piece that may attach together through center top hole of the cap.

3 Claims, 1 Drawing Sheet

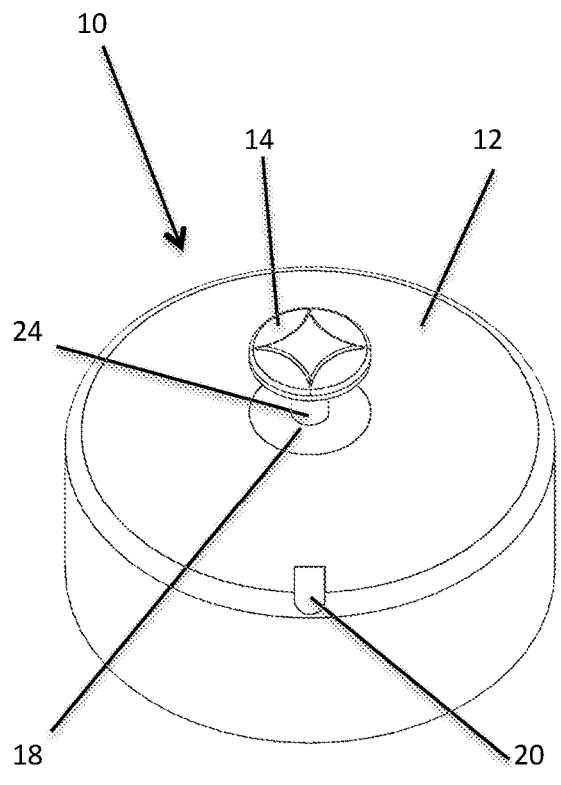
FIG: 1
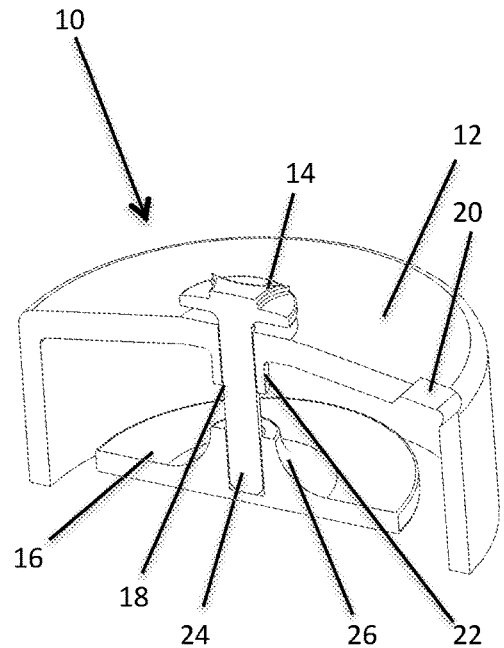
FIG: 2

TUNA PRESS STRAINER

BACKGROUND OF THE INVENTION

This invention relates to apparatus for pressing and straining liquid from canned food. The new tuna press strainer may have a cap and press that may be placed over a can of tuna to press evenly and drain liquid from a side drain hole. Also may have a cap and press that may be placed over other canned food to drain liquid and placed over portion of ground meat to press out a round patty.

Use of a tuna press or can strainer may be known. These press and strainers may be generally tuna press or can strainers. However, these devices may not direct liquid to a single drain hole or may not be as versatile.

SUMMARY OF THE INVENTION

The present invention is directed to apparatus for pressing tuna and draining liquid from can. A cap may have a press attached through the center top hole to the cap. The cap may have a width and height to fit on multiple size canned food. The cap and press may be placed over a portion of ground meat to press out a patty. The press may snap apart from cap for ease of cleaning.

These and other features, aspects and advantages of the present invention will become better understood with reference to the following drawings, description and claims.

BRIEF DESCRIPTION OF THE DRAWINGS

FIG. 1 illustrates a perspective elevation view of the tuna press strainer according to an embodiment of the invention;

FIG. 2 illustrates a perspective elevation cut view of the tuna press strainer according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Referring to FIGS. 1 and 2, a tuna press strainer 10 may have a cap 12 that may be a round, cap that may be made of plastic, or like rigid material. The cap 12 may have a width to fit on multiple canned food sizes. For example, the cap 12 may be approximately 4 inches wide. Depending on the height of cans encountered the height of the cap 12 may be for example approximately 2 inches.

There may be a top press 14 and bottom press 16 that may snap together and apart through the center hole 18 of cap 12. This may provide for easier cleaning and a compact tuna press strainer 10 storage. For example, if the tuna press strainer 10 is set in a storage drawer or on a counter, the top press 14 and bottom press 16 sits flush with cap 12.

The Figures illustrate a tuna press strainer 10 with cap 12 with drain hole 20. Drain hole 20 design and shape is for draining at any angle from cap 12.

There may be a cap support 22 on cap 12. Cap support 22 creates stable function of shaft 24 of top press 14. Cap support 22 directs liquid to drain hole 20 and prevents leak through center hole 18. Cap support 22 design is curved without corner, this prevents bacteria and dirt build up and ease for cleaning.

There may be a press support 26 on bottom press 16. Press support 26 creates stable attachment of shaft 24 of top press 14. Press support 26 design is curved without corner, this prevents bacteria and dirt build up and ease for cleaning.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus for pressing product and draining liquid from canned food such as tuna, drain liquids from canned food such as fruit and vegetables and presses out meat patties such as hamburger and sausage consisting of:
    a cap, and a press part;
    said cap consisting of a cylindrical wall and a top wall with a top center hole for receiving said press part and a side drain hole located at an intersection between the top wall and the cylindrical side wall;
    said press part comprise a top press part which includes a shaft and bottom press part which includes a flat pressing surface;
    said shaft of said top press part inserts through said center hole of said cap and is attached to said bottom press part;
    said cap having a width and a height to be placed on various sizes of a canned food;
    said cap having a cap support extending from an interior surface of said cap into an interior space defined by the cap to support said top press part and prevents fluid from entering said center hole;
    said bottom press part having a press support extending from a top surface of said top press part for said top press part, said press support receiving the shaft of said top press part.

2. The apparatus as in claim 1, wherein said shaft of said top press part is received by the bottom press part such that the top press part and bottom press part can be repeatedly attached and detached for ease of cleaning the press part.

3. The apparatus as in claim 1 wherein:
    Said cap is generally a round cap shape having a diameter of approximately 4 inches and a height of approximately 2 inches.

* * * * *